United States Patent Office 2,851,254
Patented Sept. 9, 1958

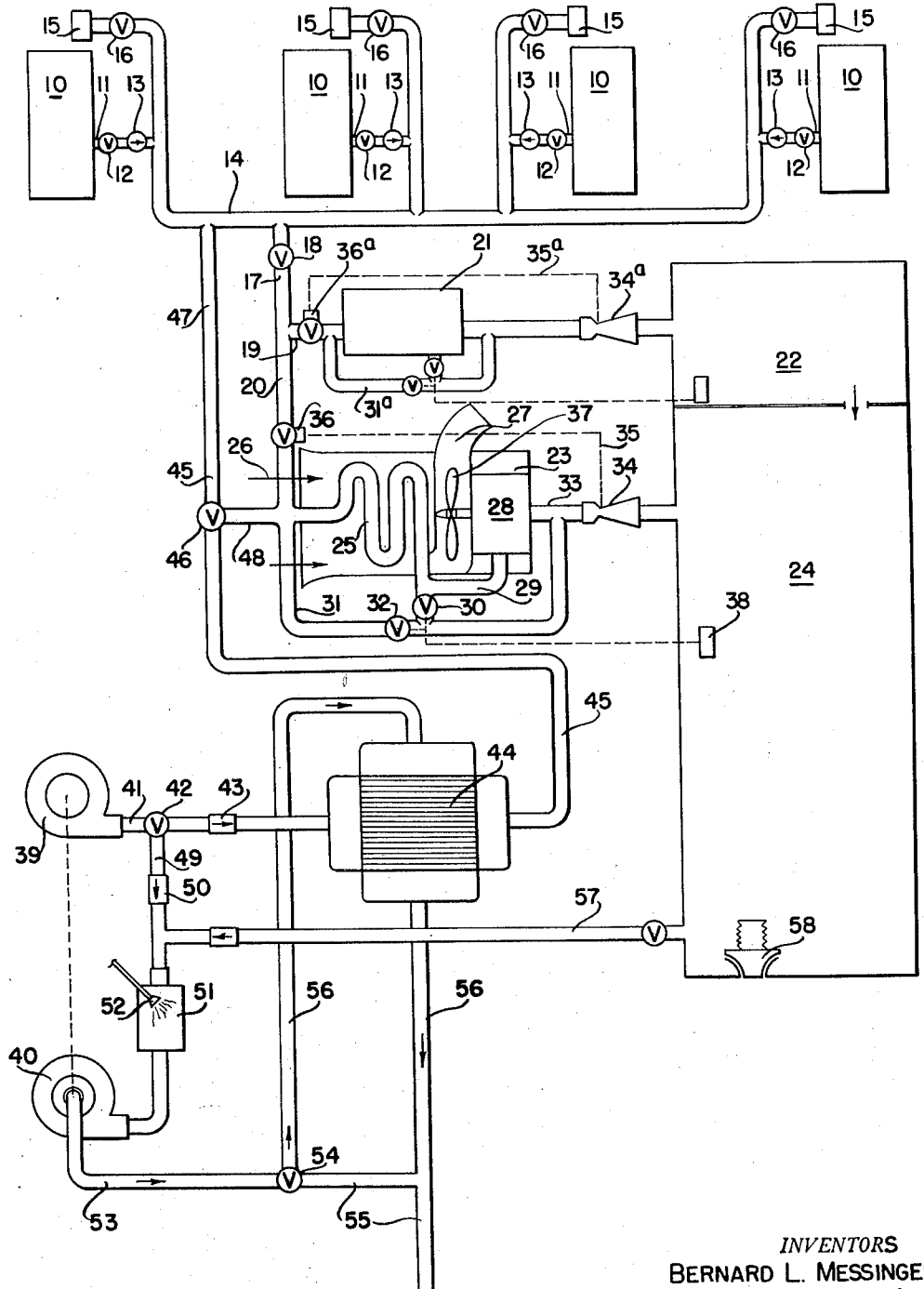

2,851,254

HIGH ALTITUDE CABIN PRESSURIZATION AND AIR CONDITIONING SYSTEM

Bernard L. Messinger, Pacific Palisades, and William W. Merrill, Jr., Burbank, Calif., assignors to Lockheed Aircraft Corporation, Burbank, Calif.

Application September 10, 1952, Serial No. 308,894

10 Claims. (Cl. 257—3)

This invention relates to a cabin pressurization system for use in combination with turbo-jet or turbo-prop powerplants in airplanes designed for flight at high altitudes, and has particular reference to the use of an auxiliary gas turbine driven air compressor to supplement air bled from the main powerplants to supply cabin pressure and provide for both heating and cooling the air supplied to the cabin and flight station.

Basically the system provides a supply of direct engine compressor bleed air paralleled by a supplemental supply of air from an auxiliary gas turbine which operates in series with the cabin. This latter gas turbine in one sense acts to recover waste energy from part of the cabin exhaust air which would otherwise be throttled overboard by the cabin pressure regulating valves.

The intention is to use the gas turbine system for supplying this supplemental stream of air at airplane altitudes over 20,000 ft. and, for these conditions, all of the air which enters the gas turbine compressor will be delivered to the cabin. Under normal high altitude conditions about 65% of the cabin air will be supplied by the auxiliary gas turbine and 35% directly from the bleed manifold of the main engines. By means of suitable ducts as indicated in the drawings, all of the air which is delivered to the combustion chamber of the gas turbine will consist of cabin exhaust air. At altitudes below 20,000 ft. it is anticipated that all of the air will be supplied to the cabin from the main engine bleed air manifold since, under these latter conditions, the penalty for bleeding the engines is not particularly severe, and the cabin pressure is not sufficient to effect economical operation of the auxiliary turbine. For ground operation as well as certain emergency conditions at low altitudes in flight, it is possible to operate the auxiliary gas turbine as a bled compressor, that is, by diverting only part of the compressor air to the cabin and allowing the major portion of it to flow directly to the combustion chamber and turbine in the conventional cycle of a gas turbine power plant.

The drawing figure also indicates the use of an exhaust heat exchanger using the waste heat of the gas turbine exhaust to increase the temperature of the gas turbine compressor air which is delivered to the cabin.

Another feature of this system which is illustrated in the drawings involves the use of, in this case, two simple air cycle refrigerators which are capable of refrigerating the entire supply of air to the cabin during ground or low altitude operation at which time all of the air is obtained from the main engine bleed manifold. This arrangement permits the use of light and compact refrigeration equipment designed for operation at the relatively high pressure ratios available from the main engines.

It may also be noted that the main engine bleed manifold is also used in the procedure of starting the main engines by means of the operation of the auxiliary gas turbine, at which time the bleed air from the auxiliary turbine is heated by the exhaust heat exchanger and then directed to any one of the pneumatic starters with which each of the main engines is provided. This same flow arrangement is also useful for heating the cabin and flight station during low temperature ground operation prior to the operation of the main engines.

For moderately warm weather operation on the ground, prior to main engine operation, some degree of ventilation and cooling will be available to the flight station by means of the smaller refrigerator operating at partial capacity. The fact that the full capacity of this refrigeration unit will not be available under these conditions is due to the smaller pressure ratio developed by the auxiliary gas turbine as compared to the pressure ratios available from the main engine bleed system.

In all systems such as this, in which cabin air is utilized in an auxiliary type of turbine, it is important to consider the effect of the variation in the cabin leakage rate through the unavoidable openings in the fuselage structure. For example, in a hypothetical system where there would be zero structural leakage and also zero flow required through the pressure regulating valves, it would be very feasible to provide the entire pressurization air supply flow by means of such a gas turbine system in which the cabin space was merely in series between the compressor and combustion chamber. If, however, an excessive amount of leakage developed in such a system, the operation of the auxiliary gas turbine would immediately become unstable and the air supply would collapse. There would also, of course, be the usual problem, as is present in all gas turbines, of requiring an external starting arrangement. In practice, it is of course, impossible to avoid at least some structural leakage and, in addition, it is necessary to provide a certain minimum air flow through the pressure regulating devices. It is for this reason that the subject system is based on the combination of a large potential source of pressurized air flow together with a supplemental source obtained from a recovery type auxiliary gas turbine. It will be noted from the arrangement of the flow controls shown on the drawings that in the event of failure of the auxiliary gas turbine during its normal operation or in the event of a large and sudden increase in cabin leakage (which would in turn cause failure of the gas turbine), the main engines would automatically be bled at an increased rate to compensate for the decrease in the air supply from the auxiliary unit.

To summarize the advantages of this system it should be noted that it is possible to materially reduce the fuel consumption that would be required for a direct main engine bleed system, by use of the recovery features of the auxiliary gas turbine at practically no weight penalty to the airplane since the auxiliary gas turbine is required in any event for the purpose of main engine starting. In addition to this advantage, the waste heat of the auxiliary turbine exhaust is recovered to provide cabin heat without resorting to such additional equipment as, for example, combustion heaters.

It is accordingly an important object of this invention to use an auxiliary gas turbine driven air compressor not only for starting the main engines, but to reduce the air bled from the main engines, especially at high altitudes wherein the main engines become increasingly sensitive to the effect of bleeding air from the compressors thereof.

It is also an important object of this invention to utilize an auxiliary gas turbine driven compressor with the cabin in series between the compressor and turbine so that the compressor delivery may be used to pressurize the cabin and heat the air supplied thereto, eliminating the need of separate heating means for the cabin.

It is a further important object of this invention to provide two separate heating and cooling systems for the flight deck and cabin of an airplane with an auxiliary gas turbine driven compressor capable of handling the flight deck system on the ground when the main engines are inoperative.

Other and further objects and advantages of this invention will become apparent as a detailed description of the schematic layout of an embodiment of the invention as shown on the accompanying drawing proceeds.

The drawing shows a schematic embodiment of this invention incorporating multiple turbo-jet or prop-jet powerplants having air bleed arrangements with an auxiliary gas turbine driven compressor for both starting the main powerplants and supplying at least part of the cabin pressurization requirements, the auxiliary compressor and turbine operating in series with the cabin and utilizing the turbine discharge for heating the air supplied to the cabin when heat is desired.

In the drawing, main powerplants of the turbine type, which may be either turbo-props or turbo-jets, are indicated by the reference numeral 10. Each powerplant 10 is provided with a bleed air connection 11 which in turn is provided with a shut-off valve 12 and check valve 13, and the several bleed air connections feed into a common duct 14. Each powerplant 10 also has an air starter 15 with a starting valve 16 connected to the common duct 14. The common duct 14 is tapped by a duct 17, controlled by a valve 18, with branches 19 and 20 leading respectively to an air cycle refrigerating unit 21 for the flight station 22 and another and proportionately larger air cycle refrigerating unit 23 for the cabin 24 of an airplane.

The air cycle refrigerating units 21 and 23 are similar except for size, and only the larger one 23 has been schematically detailed in the drawing. As shown, the unit 23 comprises a heat exchanger section 25 cooled by ram air entering the unit at 26 and discharging overboard at 27. The cooled air from the heat exchanger may be delivered to a turbine 28 through a branch duct 29 or may be diverted by a valve 30 to a bypass duct 31 which also bypasses the heat exchanger if a valve 32 therein is opened. A turbine outlet duct 33 (of the unit 23) to which the bypass ducts 29 and 31 are connected, leads through a venturi 34 to the cabin 24. The venturi 34 is tapped by a pressure sensing line 35 which operates a flow valve 36 in the duct 17 upstream of the heat exchanger 25. The turbine is loaded by a fan 37 operating in the cooling air discharge duct 27. With this arrangement the hot bleed air from the duct 17 can be refrigerated by passing it through the heat exchanger 25 and turbine 28 in series; the turbine 28 may be bypassed to obtain air partly cooled by the heat exchanger; and the entire refrigerating unit may be bypassed to use the hot bleed air for heating the cabin. A thermostat 38 in the cabin serves to actuate the bypass valves 30 and 32 to give any combination of these air flow conditions in accordance with requirements. Since the unit 21 is similar to the unit 23 it is not described in detail and its illustrated elements 31ª, 34ª, 35ª and 36ª correspond with the elements 31, 34, 35 and 36 of the unit 23. The refrigerating unit above described follows the methods of the air cycle refrigerating system disclosed in the Messinger, et al. Patent No. 2,585,570 which issued February 12, 1952, except that the secondary compressor of the patent is unnecessary because of the high pressure of the bleed air available from a turbine powerplant.

An auxiliary powerplant comprising an air compressor 39 receiving ambient air and driven by a gas turbine 40 supplies compressed air for starting the main engines. This compressed air flows through a bleed port duct 41 leading from the compressor discharge through a three-way valve 42 and check valve 43 through a heat exchanger 44 and duct 45 to another three-way valve 46, one duct 47 leading from the last mentioned valve 46 to the duct 14 to which the engine starters 15 are connected. Another duct 48 leads into the duct 17 upstream of the refrigerator 23 and the venturi 34 for a purpose to be later described.

Since the auxiliary powerplant compressor 39 must supply sufficient air for operating its turbine 40 when used as an engine starter, the bleed air valve 42 is adjusted accordingly under such conditions and then delivers compressed air through a duct 49 containing a check valve 50 and leading to a combustion chamber 51 into which fuel is injected through a fuel line 52. The combustion chamber discharges into the turbine 40 in the usual manner. A turbine exhaust duct 53 contains a three-way valve 54 which in one position exhausts overboard through a duct 55, and in the other position connects to a duct 56 leading through the heat exchanger 44, to add heat energy to the starting air or to heat the air when heat is called for in the air supplied to the cabin through the duct 48.

When the auxiliary compressor duct 45 is connected to the duct 48 to supply air to pressurize the cabin, the entire discharge of the compressor 39 is delivered to the cabin by adjusting the bleed valve 42 to cut off the airflow in the duct 49. Under such conditions the operating airflow scheduled through the pressurized area is returned through a duct 57 to the duct 49 and thence through the combustion chamber 51 to the turbine, placing the cabin area in series between the compressor and turbine and in effect recovering the pressurizing energy of the airflow through the flight station and cabin. Pressurization of both compartments is controlled by an outflow valve 58 with conventional isobaric and rate of pressure change controls.

*Description of operation*

The occupied volume of the fuselage is pressurized with air from two sources—air extracted from the main engine compressors and air from an auxiliary gas turbine compressed air generator. The entire occupied volume is pressurized as one compartment, but is divided into two zones for air conditioning. The zones are the flight station 22 and cargo compartment 24 which are ventilated, heated or cooled independently by means of the pressurization air supplied through two sets of temperature and flow regulating units 21 and 23. Both refrigeration units are of the "simple system" air-cycle type with bypasses 31 and 31ª around the respective turbines 28 alone as well as around the entire unit to provide adequate flow and temperature control under all conditions. Valves 30 and 32 in the bypass ducts are thermostat controlled to maintain the pre-selected zone temperature in either the cargo compartment or the flight station. Coolant air for the refrigeration units is admitted through ram scoops to provide adequate heat exchanger capacity when the fan 37 is inoperative (turbine bypass open). The heat exchanger of the cargo space refrigeration unit is substantially enlarged over that of a conventional "simple" refrigerator by the cooling and minimum pressure loss requirements of air supplied by the auxiliary unit.

The flow control valves 36 and 36ª are arranged to maintain a constant dynamic pressure downstream of each refrigeration unit by throttling the upstream pressure of the engine bleed air. By this arrangement the simple constant $q$ valves provide a minimum variation in mass flow with changing bleed air conditions.

During pressurized flight at altitudes above approximately 20,000 ft. the auxiliary unit is the major air source for the cargo compartment. In this mode of operation the auxiliary unit compressor 39 is not bled in the conventional manner, but instead the entire airflow of the compressor 39 is diverted into the airplane cabin while the driving turbine of the auxiliary unit is operated by exhaust cabin air (with combustion). An appropriate valving arrangement between compressor and turbine of the auxiliary unit thus converts the auxiliary unit into a gas turbine-driven cabin supercharger.

The airflow capacity of the auxiliary unit operating as a cabin supercharger is slightly below the cargo compartment flow control schedule at altitudes above 20,000 ft. A small amount of engine bleed air is then required to make up the difference and satisfy the flow control demand. The cargo compartment flow control arrangement is such that the mixture of the auxiliary unit and engine bleed air is metered for flow but only the engine bleed air is valved to satisfy the metering venturi. Any change in the auxiliary unit flow is automatically compensated for by an equal and opposite change in the engine bleed flow to satisfy the flow schedule.

The mixing point of the auxiliary unit air and engine bleed air is upstream of the cabin space refrigeration unit to provide adequate temperature control. The cooling turbine 28 is fully bypassed when the auxiliary unit is operating because of the low output pressure of the auxiliary unit. Cooling is accomplished by the heat exchanger of the refrigeration unit operating on ram pressure.

The auxiliary unit provides ground cooling or heating for flight station and cargo space without main engine operation. The flight station is cooled or heated by bleed air from the auxiliary unit ducted to the refrigeration unit (or bypassed for heating). Automatic temperature control is maintained by the flight station thermostat. Cabin compartment heating is provided by direct bleed air from the auxiliary unit heated in the exhaust gas heat exchanger 44 on the auxiliary unit.

It will thus be seen that we have invented an improved and simplified airplane cabin pressurizing and air conditioning system for operation at high altitudes, wherein an adequate supply of pressurized air cannot be bled from the compressors of turbo-jets or prop-jet power-plants without seriously affecting the economical operation thereof; wherein an auxiliary gas turbine power-plant, needed for engine starting purposes, is operated in series with the pressurized airflow through the occupied areas of the airplane fuselage to normally supply the major part of the pressurized air, supplemented by a reduced amount of bleed air from the main engine. A further feature is that control of the bleed air supplementing the auxiliary compressor air serves to regulate the entire system, without the complication of attempting to regulate the auxiliary compressor, and a heat exchanger associated with the auxiliary turbine supplies heat energy to the auxiliary compressor air for engine starting purposes and for heating the cabin air supply when required, thus eliminating the need of a separate combustion heater for the latter purpose.

Having described only a typical form of the invention we do not wish to be limited to the specific details herein set forth, but wish to reserve to ourselves any variations or modifications that may appear to those skilled in the art and fall within the scope of the following claims.

We claim as our invention:

1. In a cabin pressurizing system for aircraft the combination of bleed type turbo power plants for propulsion of the aircraft, an auxiliary gas combustion turbine and an air compressor driven by the turbine for supplying compressed air to said power plants to start the same, of duct and valve means for diverting pressurized air from said compressor to the cabin area of the aircraft, return ducts from the cabin area to the auxiliary gas turbine, an exhaust heat exchanger connected to said duct and valve means and to the auxiliary gas turbine exhaust whereby to add heat to the air supplied by said compressor when desired, an air bleed duct from said power plants also supplying air to said duct and valve means and control means responsive to the combined airflow from said compressor and said air bleed acting to control said air bleed duct.

2. In a cabin pressurizing system for aircraft the combination of bleed type turbo power plants for propulsion of the aircraft, an auxiliary gas combustion turbine and an air compressor driven by the turbine for supplying compressed air to said power plants to start the same, of duct and valve means for diverting pressurized air from said compressor to the cabin area of the aircraft, return ducts from the cabin area to the auxiliary gas turbine, an exhaust heat exchanger connected to valve and duct means and to the auxiliary gas turbine exhaust whereby the turbine exhaust gases add heat to the air supplied by said compressor when desired, an air bleed duct from said power plants also supplying air to said duct and valve means, an air cycle refrigerating system incorporated in said duct and valve means to cool the air being supplied to the area by said means, and control means responsive to the combined airflow from said compressor and said air bleed acting to control said air bleed duct.

3. In a cabin pressurizing system for aircraft having turbo power plants, the combination of an auxiliary power plant including a gas turbine, a compressor driven by the turbine and a passage conducting compressed air from the compressor to the turbine, a duct delivering compressed air from the compressor to the cabin of the aircraft, a return duct conducting air from the cabin to said passage of the auxiliary power plant between the turbine and compressor, a heat exchanger arranged to transfer the gas turbine discharge heat to the air delivered to the cabin, an air bleed duct from the turbo power plants communicating with the duct from the compressor downstream from the heat exchanger for supplementing the compressor air delivered to the cabin, and control means for said air bleed duct limiting the total air flow to said cabin by variation of the supplemental air supply through said air bleed duct.

4. In a cabin pressurizing system for aircraft having turbo power plants, the combination of an auxiliary gas combustion turbine, a compressor driven by the turbine and having a duct delivering air from the compressor to the cabin of the aircraft, a return duct for air from the cabin to the auxiliary gas turbine, a heat exchanger arranged to transfer the gas turbine discharge heat to the air delivered to the cabin, an air bleed duct from the turbo power plants communicating with the duct from the compressor downstream from the heat exchanger for supplementing the compressor air delivered to the cabin, an air cycle refrigerating system in parallel with the portion of the duct from the compressor which extends from its point of communication with the air bleed duct and the cabin, means for selectively diverting the air flow from the compressor to the cabin through the refrigerating system when cooling is desired, and control means for said air bleed duct operable to control the total air flow to said cabin by regulating the flow of the supplemental air supply through said air bleed duct.

5. In a cabin pressurizing system for aircraft having turbo power plants, the combination of an auxiliary power plant including a gas turbine, a compressor driven by the turbine and a passage conducting compressed air from the compressor to the turbine, a duct delivering air from the compressor to the cabin of the aircraft, a return duct returning air from the cabin to said passage of the auxiliary power plant between the turbine and compressor, an air bleed duct from the turbo power plants communicating with the compressor duct for supplementing the compressor air delivered to the cabin, and control means for said air bleed duct limiting the total air flow to said cabin by variation of the supplemental air supply through said air bleed duct.

6. In a cabin pressurizing system for aircraft having turbo power plants, the combination of an auxiliary gas combustion turbine, a compressor driven by the turbine and having a duct delivering air from the compressor to the cabin of the aircraft, a return duct for air from the cabin to the auxiliary gas turbine, an air bleed duct from the turbo power plants communicating with the compressor duct for supplementing the compressor air delivered to the cabin by the compressor, an air cycle refrigerating system in parallel with the portion of the duct from the compressor which extends from its point of communication with the air bleed duct to the cabin, means for selectively diverting the air flow from the compressor to the cabin through the refrigerating system when cooling is desired, and control means for said air bleed duct operable to control total air flow to said cabin by regulating the supplemental air supply through said air bleed duct.

7. The method of operating a cabin pressurization system for air bled types of turbo driven aircraft at high altitudes, wherein an auxiliary gas combustion turbine driven compressor is connected in series with the aircraft cabin and operated at its best efficiency to supply a major portion of the air required for cabin pressurization, supplementing the auxiliary compressor air supply with air bled from the turbos driving the aircraft, and controlling the total air flow to the aircraft cabin by regulating the flow of air bled from said turbos.

8. The method of operating a cabin pressurization system for air bled types of turbo driven aircraft at high altitudes, wherein an auxiliary gas combustion turbine driven compressor is connected in series with the aircraft cabin and operated at its best efficiency to supply a major portion of the air required for cabin pressurization, supplementing the auxiliary compressor air supply with air bled from the turbos driving the aircraft, selectively heating the air delivered by the compressor in heat exchanging relationship with the discharge from said gas turbine, and controlling the total air flow to the aircraft cabin by regulating the flow of air bled from said turbos.

9. The method of operating a cabin pressurization system for air bled types of turbo driven aircraft at high altitudes, wherein an auxiliary gas combustion turbine driven compressor is connected in series with the aircraft cabin and operated at its best efficiency to supply a major portion of the air required for cabin pressurization, supplementing the auxiliary compressor air supply with air bled from the turbos driving the aircraft, selectively cooling the air delivered to said cabin by passing the air through an air cycle refrigerating system, and controlling the total air flow to the aircraft cabin by regulating the flow of air bled from said turbos.

10. The method of operating a cabin pressurization system for air bled types of turbo driven aircraft at high altitudes, wherein an auxiliary gas combustion turbine compressor is connected in series with the aircraft cabin and operated at its best efficiency to supply a major portion of the air required for cabin pressurization, supplementing the auxiliary compressor air supply with air bled from the turbos driving the aricraft, selectively heating the air delivered by the compressor by directing it in heat exchanging relationship with the discharge from said gas turbine, selectively cooling the air delivered to said cabin by passing the air through an air cycle refrigerating system, and controlling the total air flow to the aircraft cabin by regulating the flow of air bled from said turbos.

References Cited in the file of this patent
UNITED STATES PATENTS

| | | |
|---|---|---|
| 2,002,057 | Gregg | May 21, 1935 |
| 2,119,402 | Puffer | May 31, 1938 |
| 2,309,064 | Gregg et al. | Jan. 19, 1943 |
| 2,328,489 | Pfau | Aug. 31, 1943 |
| 2,391,838 | Kleinhans et al. | Dec. 25, 1945 |
| 2,485,590 | Green | Oct. 25, 1949 |
| 2,491,462 | Wood | Dec. 13, 1949 |
| 2,582,848 | Price | Jan. 15, 1952 |
| 2,585,570 | Messinger et al. | Feb. 12, 1952 |
| 2,618,470 | Brown | Nov. 18, 1952 |
| 2,622,406 | Scofield | Dec. 23, 1952 |
| 2,734,443 | Wood | Feb. 14, 1956 |